Oct. 2, 1951

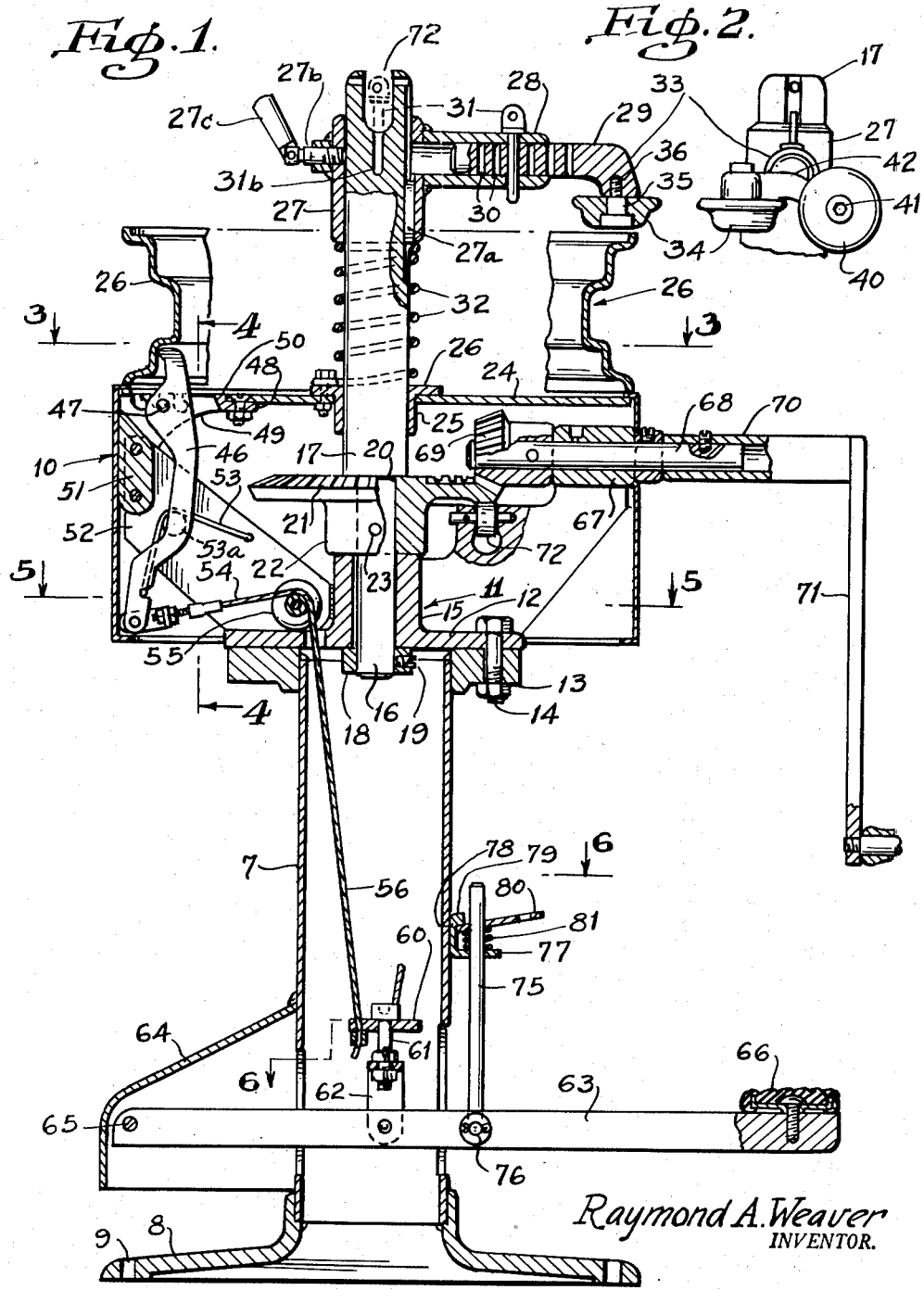

R. A. WEAVER 2,569,789

MACHINE WITH CIRCUMFERENTIALLY TRAVELING ELEMENTS FOR MOUNTING TIRES

Filed March 20, 1948

Raymond A. Weaver
INVENTOR.

BY Robt. W. Pearson
ATTORNEY.

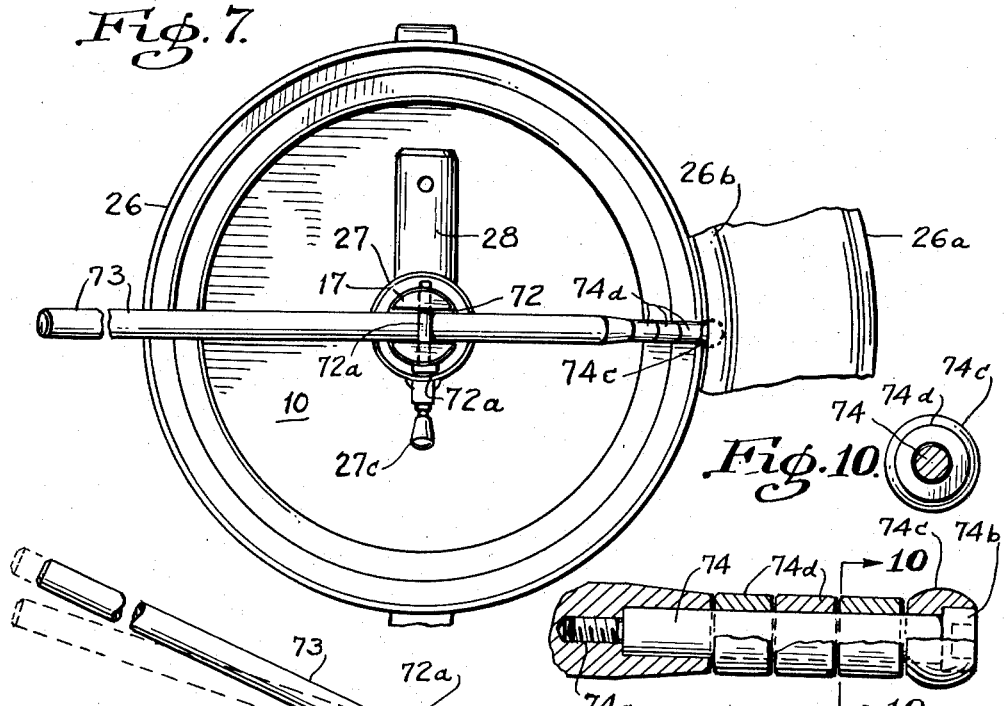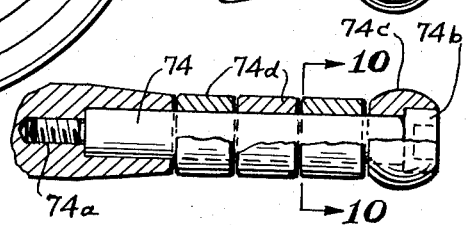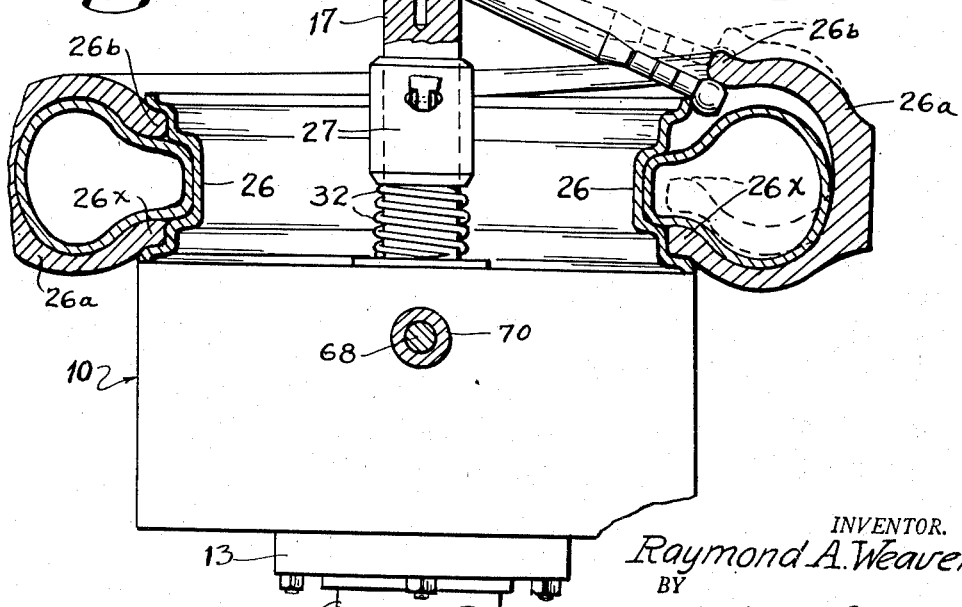

Patented Oct. 2, 1951

2,569,789

UNITED STATES PATENT OFFICE 2,569,789

MACHINE WITH CIRCUMFERENTIALLY TRAVELING ELEMENTS FOR MOUNTING TIRES

Raymond A. Weaver, Los Angeles, Calif.

Application March 20, 1948, Serial No. 15,991

3 Claims. (Cl. 157—1.24)

This invention relates to a machine for mounting pneumatic tires upon and demounting them from the wheels of automobiles.

Among the objects of the invention are: to simplify the tire mounting and tire removing operations; to dispense with the use of hand tools in the mounting of pneumatic tires upon or removing of them from automobile wheels; and to mount and demount pneumatic tires without handling them in a rough, injurious manner.

Another object is to provide, in a single, compact mechanism, means usable both to apply and remove pneumatic tires from automobile wheels.

A more specific object is to provide a machine for the purpose above stated that will protect the white side walls (when present) of certain tires.

Among other improved features, the present machine has superior means for releasably locking the mounted vehicle wheel rim in a properly centered, nonrotatable position for the tire applying and tire removing tools to operate on the tire thereof both when they apply and remove the tire.

Other objects, advantages and features of invention will hereinafter appear.

Referring to the accompanying drawings, which illustrate a preferred embodiment of the invention, now in operation, Fig. 1 is a vertical midsection of the machine taken centrally therethrough and showing an automobile wheel mounted thereon.

Fig. 2 is an elevational detail looking from right to left toward parts shown in the right-hand upper portion of Fig. 1.

Fig. 7 is a top plan view of the machine illustrative of the operation of the pry rod used to remove tires from a wheel rim, a fragment of a tire being operated on being included in the view. In this view the arm carrying the tire replacement rollers has been detached and, for the most part, there is included in the view only structure which aids in understanding the operation of said pry rod.

Fig. 8 is a view of the structure shown in Fig. 7, the tire and upper portion of the mounting shaft for the pry rod being sectioned and the remaining parts shown in elevation.

Fig. 9 is a fragmental view, partly in midsection and partly in side elevation, showing, on an enlarged scale, the operative end portion of the pry rod.

Fig. 10 is a cross section on line 10—10 of Fig. 9.

Figure 3:
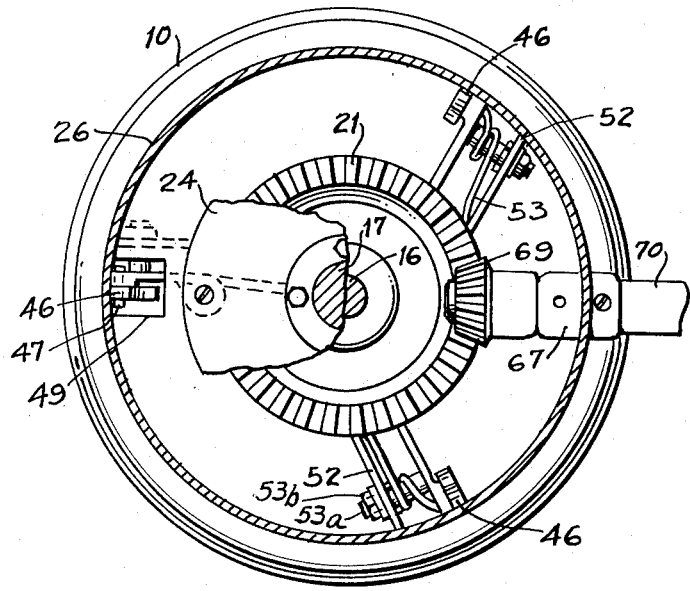
Fig. 3 is a horizontal section on line 3—3 of Fig. 1.

Referring in detail to the drawing, the working parts of the machine are shown supported by a tubular standard 7 carried by an expanded circular base 8 having apertures 9 through its peripheral portion to receive fastening means securable to a floor.

A drum shaped casing 10 is concentrically mounted upon the upper end of said standard. A bearing member 11 is contained within the lower portion of said casing, this member having a circular basal flange 12, which is centered upon the upper end of the tubular standard 7 by means of a collar 13 which surrounds the upper end portion of said standard and is apertured to receive bolts 14 to secure the flange 12 to it.

Upstanding from the central portion of the flange 12 is a bearing hub 15 axially bored to receive with a working fit the diametrically reduced lower end portion 16 of an upstanding, rotatable, tool-carrying shaft 17, said shaft portion 16 having a retaining collar 18 secured to its lower end by a set screw 19.

Owing to the shaft portion 17 being of a greater diameter than the shaft portion 16 a downwardly facing annular shoulder 20 is produced between said two shaft portions. Between said shoulder and the upper end of the hub 15 is interposed a large bevel gear 21 having a hub 22 which is pinned at 23 to the shaft portion 16, the lower end of said hub turnably resting upon the upper end of the aforesaid hub 15 of the flange or plate 12.

The upper side of the casing 10 has a cover plate 24 centrally apertured to receive around shaft 17 a bearing collar 25 having around its upper end an outwardly directed flange 26 which is bolted to said cover 24.

Means will later be described for nonrotatably holding in place the vehicle wheel rim 26 and for centering said rim around the tool-carrying shaft portion 17. This shaft has splined to its upper end portion by a spline 27a a tool carrying head or vertical sleeve 27 having welded or otherwise secured to it a horizontal sleeve 28 into which adjustably telescopes the tool carrying arm 29. Diametrically through said arm extends a row of longitudinally spaced apart bores 30 selectively to receive a pin 31 to maintain said arm adjusted to extend the desired distance, said pin passing through a pair of vertically opposite holes in the sleeve arm 28. Said pin 31 when not in use may occupy a bore 31b in the shaft 17. Although the tubular head or sleeve 27 must turn with the shaft 17, yet it is free to slide lengthwise of said shaft, its downward movement being opposed by a compression spring 32 coiled around said shaft, said spring offsetting the weight of the sleeve 27 and parts carried thereby, so that the operator may, with ease, adjust said parts vertically.

Said sleeve 27 carries a set screw 27b operable by a swingable handle 27c to lock the sleeve at the desired elevation. Said handle also serves to adjust the sleeve vertically.

Returning to the tool-carrying arm 29 and parts associated therewith, said arm has a horizontally and downwardly deflected outer end portion 33 which carries a leading tire replacement roller 34 which is supported by a vertical bearing pin 35 to rotate in a horizontal plane. Said bearing pin is of a stepped character, diminishing in diameter from below upwardly, its diametrically reduced upper end portion 36 being screwed firmly into a downwardly opening threaded socket provided for it in the downwardly directed end portion 33 of the arm 29.

With said leading roller 34 cooperates a trailing roller 40 carried by a horizontal bearing pin 41 directed into a downwardly inclined extension 42 of the arm 29, said roller 40 having its lower side of its periphery at a lower level than the lower face of the leading roller 34.

Figure 4:
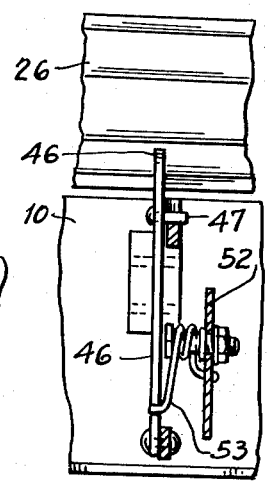
Fig. 4 is a fragmental sectional detail taken on line 4—4 of Fig. 1.
Figure 5:
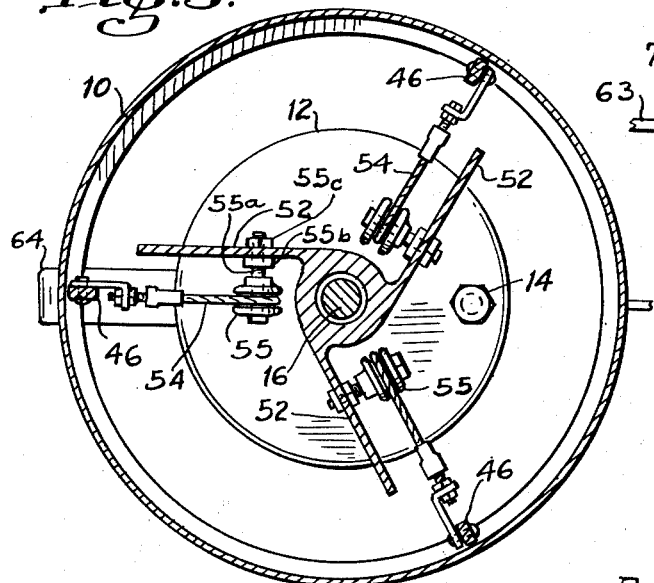
Fig. 5 is a horizontal section taken on line 5—5 of Fig. 1.
Figure 6:
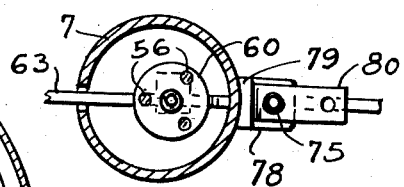
Fig. 6 is a horizontal section of the central part of the lower portion of the machine, the plane of section being indicated by angular line 6—6 of Fig. 1.

The vehicle wheel rim 26 rests upon the peripheral portion of the cover plate 24 of the housing 10 and while so supported is centered about the shaft 17 and is nonrotatably held in its centered position by a plurality of vertically extending grip levers 46 which are pendantly supported adjacent to their upper ends by pivot pins 47. Said pivots 47 are shown carried by triangular brackets 48, each of said brackets having through it an opening 49 through which the upper portion of the associated lever 46 extends with a working clearance around it. Each of said brackets has an inwardly projecting arm 50 which underlies and is bolted to the casing cover 24, and a downwardly extending arm 51 which is riveted or otherwise secured to an inclined mounting plate 52 within the casing 10. This mounting plate also affords anchorage for one limb of an angular wire spring 53 arranged to urge outwardly the lower end of each lever 46 with which it is associated. Said springs are coiled about headed studs 53a secured to plates 52 by nuts 53b. One end of each spring is anchored to said plate 52 and the opposite end thereof engages said lever 46 as shown in Fig. 4.

Means are provided for inswinging in unison the lower ends of the wheel rim gripping levers 46 against the opposition of the springs 53 so that the upper ends of said levers will simultaneously swing outwardly against the interior of the wheel rim being centered and gripped by them. For this purpose traction cables are provided having approximately horizontal upper runs 54 adjustably secured to the lower end portions of the levers 46, said cables passing over antifriction pulleys 55 and thence continued downwardly into the tubular support 7 as approximately vertical runs 56. Said pulleys are carried by stub shafts 55a secured by nuts 55b and 55c to the lower portions of the mounting plates 52.

The lower end portions of the several cable runs 56 are all made fast in an adjustable manner to a head 60 carried by an upstanding stem 61, in turn connected at its lower end to a coupling 62 pivotally connected with a horizontally extending foot lever 63. This lever extends diametrically through the apertured lower portion of the tubular support 7, said support having on one side an extension 64 to the outer portion of which one end of said lever is pivoted at 65. The opposite end of said lever carries a foot rest 66.

The means having now been described for maintaining the vehicle wheel rim 26 upon the machine and releasably holding said rim against rotation, attention is now directed to the means for rotating the already mentioned gear 21 so as to cause the tire replacement (and tire removing) rollers shown in detail in Fig. 2, to act, for example, upon a partly applied tire and force it into its fully applied position upon the wheel rim. For this purpose a suitable bearing 67 is mounted in the right hand part of the casing 10 as viewed in Fig. 1, to support turnably a shaft 68 carrying a pinion bevel gear 69 in mesh with the aforesaid gear 21. A portion of said shaft 68 projects outside of the casing 10 and has fitted over it and secured to it a sleeve 70, the outer end of the sleeve having fixed to it an operating crank 71. Of course it is to be understood that the shaft 68 may be motor driven, if desired.

In order to stabilize the operation of the large gear 21 a supporting roller 72 is mounted under the peripheral portion of said gear at the side thereof which meshes with said pinion gear.

In order to "break" (loosen) the beads of a tire preparatory to removing it from a wheel rim that has been mounted upon the machine, a pry rod 73 is fulcrum-mounted upon the machine, the pry rod 73 is fulcrumed between its ends within a crotch 72 extending diametrically across the upper end of the shaft section 17.

One end portion of said pry rod 73 is axially bored to receive a bearing pin 74 having a diametrically reduced inner end portion 74a screwed into said arm. Said pin has a head 74b on its outer end which holds in place a rotatable, antifriction outer head or knob 74c. A series of rotatable collars or anti-friction rollers (three are shown) are mounted upon the part of said pin 74 intervening between said knob 74c and the end of the arm 73. These rollers all being alike are each designated 74d.

A pin 72a (see Fig. 8) bridges the upper end portion of the slot 72 to prevent the operative end portion of the pry rod 73 from swinging down beyond the full line position thereof shown in Fig. 8.

In order to releasably lock the foot lever 63 in its depressed position, thereby to maintain the mounted vehicle wheel rim nonrotatable, an upstanding arm 75 has its lower end pivoted to said lever at 76, its upper end portion extending through an aperture in a horizontal plate 77 that forms part of a bracket 78 welded or otherwise secured to the outer side of the tubular support 7. Said bracket at its upper end carries a lip 79 overlying a locking plate 80 at one end, said plate having through it an aperture that surrounds the arm 75 with a slight clearance. Therefore the coil spring 81 tends to cause the arm 75 to be locked against upward movement by the plate 80.

In the operation of the machine, preparatory to operating the crank 71 to rotate the tool-carrying shaft 17, the wheel rim 26 will be placed upon the top of the drum shaped casing 10 in approximately the position shown in Fig. 1, and then the tire to be applied to the wheel rim will be looped over that side portion of said rim which is adjacent to the rollers 34 and 40. Thereupon, with the tire's bead in the proper relation to said two rollers, the crank is operated in a direction to cause the leading roller 34 to precede the trailing roller 40. This will cause said leading roller to press the inner face of the tire's bead over the rim of the vehicle wheel. Then the following or trailing roller 40 travels along the outer edge of said bead and in doing so forces the latter to a point where it is in alinement with the inner or peripheral face of said wheel rim, at which time the tire is caused, by the rotation of the tool-carrying shaft 17, to snap into its finally mounted position.

After the foot lever 63 has been depressed, the arm 75 and spring pressed locking plate 80 associated therewith will lock said lever in its depressed position, so that the workman need not keep his foot upon the foot rest 66 while operating the crank 71. When he desires to release said foot lever and thereby cause the gripping levers 46 to relax their grip upon the mounted wheel rim, all he has to do is to press downwardly upon the outer end of the locking plate 80, thus bringing said plate to a horizontal position, causing it to relax its "bite" (clamp) upon the arm 75.

The operation of removing a tire from a wheel rim will be performed by using the pry rod 73 after the tool-carrying arm 29 has been detached from the sleeve arm 28 (as is possible after removing the pin 31, see Fig. 1), said pry rod 73 is mounted in the position shown in Fig. 8 with its operative end portion crowded under the bead 26b of the tire 26a. The workman will now turn the crank 71, thus rotating the shaft 17, as he does in applying a tire. The rotating of said shaft will cause the operative end portion of said pry rod to travel along the under side of the upper tire bead 26b until it is completely loosened from the wheel rim, as indicated by dotted lines in Fig. 8. Then the workman, after removing the pin 72a, may readjust the pry rod in relation to the tire so that the operative end portion of said rod underlies the lower tire bear 26x, while said rod still occupies the crotch 72. Then he can force the outer end of the pry rod downwardly until he can replace the pin 72a thereabove, whereupon he can remove his hand from the pry rod and by again rotating the shaft 17 cause said rod completely to remove the tire from the wheel rim. Both in applying and removing tires it is not necessary to hold on to the pry rod.

I claim:

1. In a machine of the kind described, an upstanding tubular support, a drum-shaped casing concentrically mounted upon the upper end of said support, a bearing member in the lower portion of said casing and consisting of a circular plate having an upstanding hub portion and a peripheral portion secured to the upper end of said tubular support and projecting radially beyond all sides of the latter and secured thereto, a wheel mounting means comprising an upstanding shaft having its lower end portion turnably contained within said hub portion, a bevel gear located above said hub portion and concentrically secured to said shaft to turn therewith, driving means for said bevel gear and shaft including a pinion gear in mesh with the former, a portion of said shaft projecting upwardly above the aforesaid casing, means for releasably holding a vehicle wheel against rotation in a surrounding concentric relation to said upwardly projecting shaft portion, said holding means comprising a plurality of vertically extending grip levers pivoted to said casing subjacent to their upper ends and having operating cables connected to their lower ends, said cables being led inwardly over outer-friction pulleys and thence down into the aforesaid tubular support, an operating means common to all of said cables connected with them within said tubular support, and tire placement means carried by the aforesaid upwardly projecting shaft portion and put into operation when the latter is rotated to travel along and complete the placement of a tire partly applied to the aforesaid wheel.

2. In a machine of the kind described, an upstanding tubular support, a casing mounted upon the upper end of said support, vehicle wheel supporting means associated with said casing to support a vehicle wheel lying in a horizontal plane, and means for releasably holding the vehicle wheel against rotation in its aforesaid position while tires are being applied to or removed from it, said holding means comprising a plurality of vertically extending grip levers pivoted to said casing subjacent to their upper ends, cables having horizontally extending runs connected to the lower end portions of said levers and extending inwardly towards a common center and downwardly extending runs leading into said tubular support, there being anti-friction pulleys carried by said casing for said cables where their horizontal and downwardly extending runs meet, and an operating means common to all of said cables connected with their downwardly extending runs.

3. The subject matter of claim 2, and a head within said tubular support to which said downwardly extending cable runs are connected, and a horizontally extending foot-operable lever mounted upon said tubular support and connected with said head to exert downward traction thereupon.

RAYMOND A. WEAVER.

REFERENCES CITED

The following references are of record in the file of this patent:

UNITED STATES PATENTS

| Number | Name | Date |
|---|---|---|
| 189,506 | Seymour | Apr. 10, 1877 |
| 560,354 | Hain | May 19, 1896 |
| 959,669 | Weist | May 31, 1910 |
| 1,341,726 | Weaver et al. | June 1, 1920 |
| 1,428,440 | Kerschbaum | Sept. 5, 1922 |
| 1,752,759 | Smith | Apr. 1, 1930 |
| 1,793,864 | Manley | Feb. 24, 1931 |
| 1,944,266 | Potter | Jan. 23, 1934 |
| 2,034,819 | Maulis | Mar. 24, 1936 |
| 2,201,982 | Bazarek | May 28, 1940 |
| 2,437,512 | Ekse | Mar. 9, 1948 |
| 2,470,534 | Thomas | May 17, 1949 |
| 2,471,642 | Moltz | May 31, 1949 |
| 2,505,172 | Coats | Apr. 25, 1950 |

OTHER REFERENCES

Popular Science Magazine, May 1940, page 94.